Nov. 7, 1961               I. JEPSON               3,007,219
METHOD AND APPARATUS FOR MANUFACTURING COMPOSITE
METAL HEATING DEVICES
Filed Sept. 17, 1958                             2 Sheets-Sheet 1
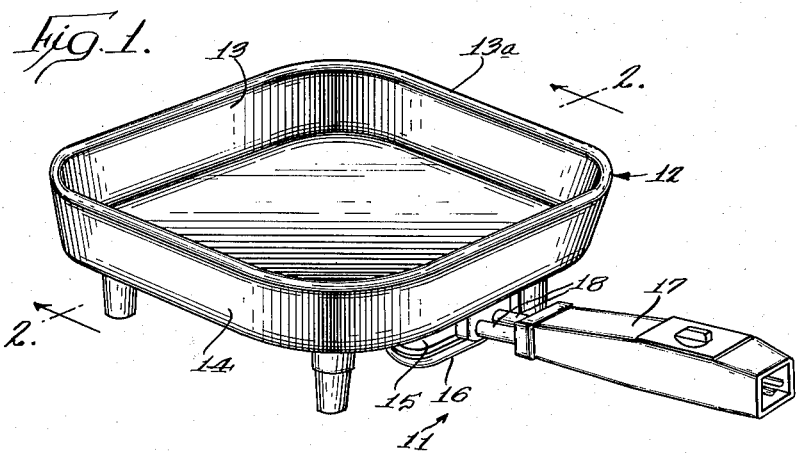
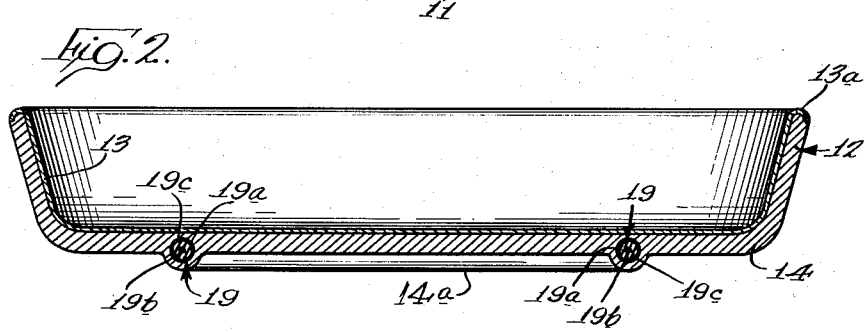
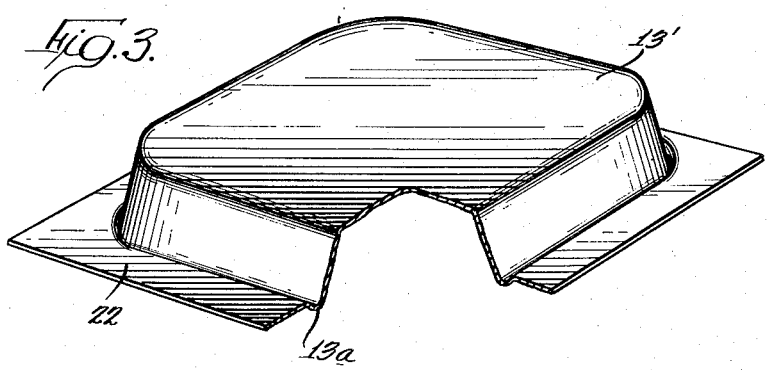
INVENTOR.
Ivar Jepson
BY
George R. Clark
Atty.

Nov. 7, 1961            I. JEPSON            3,007,219
METHOD AND APPARATUS FOR MANUFACTURING COMPOSITE
METAL HEATING DEVICES
Filed Sept. 17, 1958            2 Sheets-Sheet 2
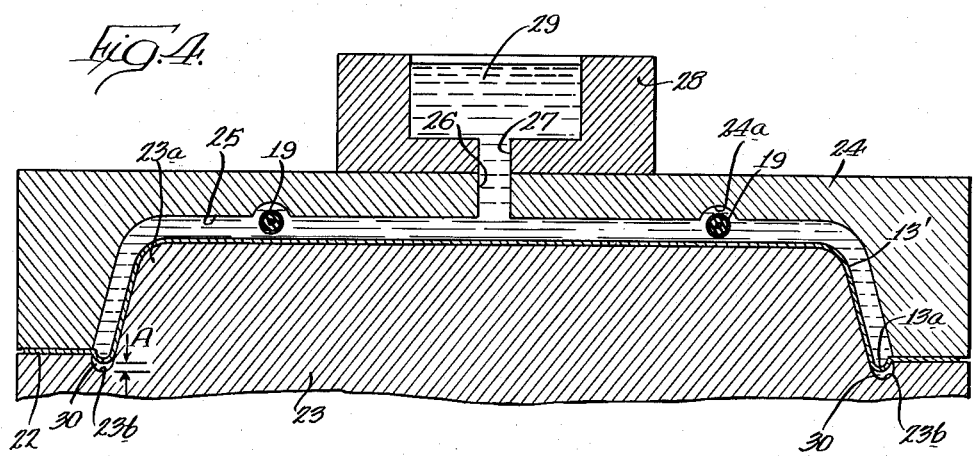
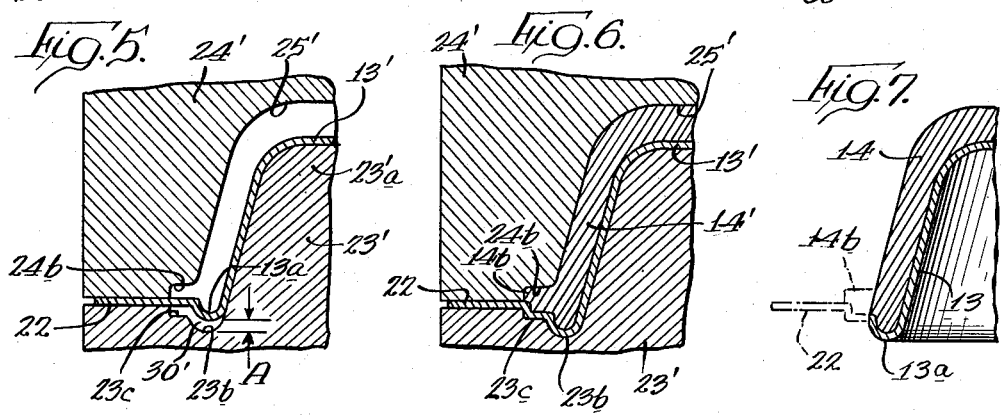
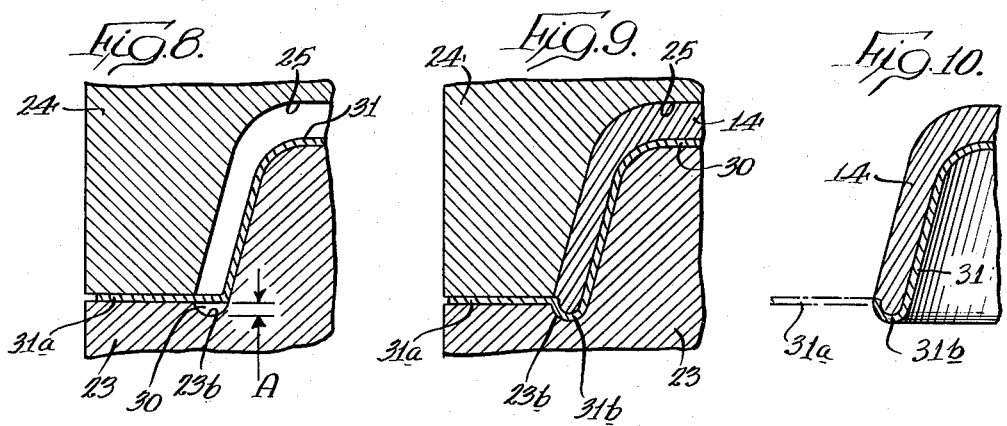
INVENTOR.
Ivar Jepson
BY
George R. Clark
Atty.

United States Patent Office 3,007,219
Patented Nov. 7, 1961

3,007,219
METHOD AND APPARATUS FOR MANUFACTURING COMPOSITE METAL HEATING DEVICES
Ivar Jepson, Oak Park, Ill., assignor to Sunbeam Corporation, Chicago, Ill., a corporation of Illinois
Filed Sept. 17, 1958, Ser. No. 761,636
5 Claims. (Cl. 22—203)

The present invention relates to methods and apparatus for manufacturing composite metal heating devices and more particularly to methods and apparatus for casting a layer of one metal at least partially around a preformed layer of another metal, such for example, as casting an aluminum layer onto a stainless steel liner for a cooking vessel.

The trend in cooking vessels has changed radically within the last few years. The beginning of this trend occurred with the development of the completely automatic self-contained cooking vessel immersible in liquid for cleaning purposes disclosed in Jepson Patent 2,744,-995 granted May 8, 1956, and assigned to the same assignee as the instant application. Millions of cooking vessels as disclosed and claimed in this Jepson patent have been sold and are in use today. Since that time, numerous manufacturers have placed cooking vessels of various types and designs on the market, the attempt always being to provide a cooking vessel which is self-contained and yet which may readily be cleaned by immersing in a cleaning liquid. Obviously the housewife of today is not satisfied with a cooking vessel which cannot be immersed in liquid.

The problem of manufacturing such cooking vessels so that they can be immersed for cleaning purposes has not been a simple one to solve and manufacturers have made the vessels in various ways. Some have been made as castings of light metal such as aluminum, with the heating elements embedded within the casting. The vessels have also been drawn from sheet metal with the necessity of soldering and welding the joints to insure immersibility of the completed vessel.

It has long been appreciated that an ideal cooking vessel is one that has an interior surface which is nonporous and which is not affected by the various foods and materials to which it is subjected during a cooking operation. Such metals as stainless steel, titanium and the like are ideal for this purpose. They do not tarnish with use, provide a surface which can be cleaned with ease regardless of the foods to which the surface is subjected during the cooking operation, and are sufficiently dense so that there are no pores or the like into which the food can enter. A cooking surface, therefore, made of stainless steel would, from that standpoint, be desirable and would eliminate the necessity of coating the cooking surface of such cooking vessels with some suitable material as is commonly the case now.

Unfortunately, metals such as stainless steel and titanium are not good conductors of heat and are in an entirely different class from such metals as aluminum and copper which are very good conductors of heat. If the stainless steel cooking surface could have a heating element applied thereto which was distributed over the entire surface, then the conductivity thereof would not be important. As a practical matter, however, electrical heating elements are usually in the form of a sheathed element or a similar element which provides almost line contact with the cooking surface to be heated, and it is neither practical nor economical to include a heating element in contact with the entire cooking surface to insure uniform distribution of heat. In fact, it is usual to have only a C-shaped or looped element engaging the bottom of the cooking vessel of substantial area. This automatically throws out stainless steel as a satisfactory metal for making a complete cooking vessel, since to get uniform heat distribution from a line type heat source it is necessary to rely on a heat-spreading surface which will spread the heat uniformly over the entire cooking surface. It is for this reason that most of the automatic cooking vessels today are manufactured from aluminum which provides a very satisfactory heat distribution. Unfortunately, aluminum is not as satisfactory as stainless steel for a cooking surface aside from the heat distribution factor.

It has been suggested to manufacture cooking vessels of multilayer materials having a cooking surface defined of a more desirable material such as stainless steel or the like, and to apply to the opposite side of the cooking surface a metal of good heat conductivity in contact with a heating element which would therefore spread the heat uniformly to the stainless steel cooking surface. As a matter of fact, cooking vessels have been manufactured with a stainless steel liner and an external shell of aluminum. Unfortunately, these devices have been unsatisfactory due to the fact that a poor bond was obtained between the stainless steel liner and the exterior of aluminum. Such multiwalled vessels have been cut apart and it has been found that there actually were many voids between the liner and the exterior shell. This of course completely defeats the purpose since the air in the voids is an even less satisfactory heat conductor than stainless steel and one might better make the vessel entirely of stainless steel in the first place. Numerous attempts have been made to produce such multiwalled vessels with a variety of techniques. In a copending Hanzel application Serial No. 723,893 filed March 25, 1958, and assigned to the same assignee as the instant application, there is disclosed an improved cooking vessel and method of making the same wherein a stainless steel liner is molecularly bonded to a backing layer of cast aluminum. Also in the copending Jepson application Serial No. 723,-877 also filed on March 25, 1958, and assigned to the same assignee as the present application there are disclosed a variety of methods of manufacturing a cooking vessel having a stainless steel liner which is mechanically bonded to a backing of cast metal. Heating devices or cooking vessels having a stainless steel liner and an external layer of a good heat conducting metal such as aluminum or copper may be made by the method disclosed and claimed in Jepson Patent 2,807,700, assigned to the same assignee as the instant application. When cooking vessels are made in accordance with the teachings of Jepson Patent 2,807,700 or Jepson application Serial No. 723,877, a relatively thin liner of stainless steel or similar metal deformed to the desired shape of the cooking vessel is provided with a heating element suitably associated therewith and a layer of aluminum or similar metal of high thermal conductivity is cast onto the liner and mechanically bonded thereto while at the same time the heating element is embedded therein. The aluminum or similar metal is applied by a die casting operation which means that molten metal is supplied under pressure into a cavity defined in the mold adjacent the stainless steel liner. Such molten aluminum is usually at a temperature in excess of 1100° F. and the thin stainless steel liner due to its small mass is rapidly heated with resultant expansion thereof relative to the die in which it is supported, which die has a much greater mass and hence does not expand nearly as much. Such expansion has resulted in wrinkling of the liner with the consequence that a completely unsatisfactory cooking surface is obtained. It has been suggested to preheat the liner as well as the die or at least a die insert to the high die casting temperature to eliminate the expansion when the hot molten metal strikes the liner, but this has proven to be awkward and expensive.

It would be desirable to provide a method and apparatus for forming a cooking vessel having a thin liner of stainless steel or similar satisfactory cooking surface to the back of which is cast a layer of aluminum or other metal in which the liner is not wrinkled or otherwise distorted during the casting operation and wherein it is not necessary to preheat the liner to the casting temperature.

Accordingly, it is an object of the present invention to provide a new and improved method of producing a heating device having a heating surface of one metal and a backing surface of a different metal.

It is another object of the present invention to provide an improved method and apparatus for die casting a layer of aluminum or similar metal onto a stainless steel liner, which liner defines the cooking surface for a cooking vessel.

It is a further object of the present invention to provide an improved method of casting molten aluminum over the exterior of a stainless steel cooking surface while automatically maintaining the stainless steel cooking surface under a tensile force so as to take care of expansion caused by heating thereof from the molten aluminum.

A still further object of the present invention resides in utilizing the hydraulic pressure of the molten metal in a die casting operation to take up any expansion of a liner in the mold cavity by virtue of heating the liner when exposed to the molten metal.

Still another object of the present invention resides in the provision of a new and improved liner blank for a cooking vessel which may be tensioned by the pressure of molten casting metal when such metal is cast against the liner.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 1 is a perspective view of a cooking vessel of the multilayer or composite type made by the method and with the apparatus of the present invention;

FIG. 2 is an enlarged sectional view taken on line 2—2 of FIG. 1 with certain portions thereof omitted to simplify the drawings;

FIG. 3 is a perspective view of a liner blank with certain portions thereof cut away which is incorporated in accordance with the methods of the present invention into the cooking vessel of FIG. 1 to provide the cooking surface thereof;

FIG. 4 is a sectional view taken through apparatus for manufacturing the cooking vessel of FIG. 2 showing how the liner blank of FIG. 3 is employing during one step in the manufacturing process thereof;

FIG. 5 is an enlarged fragmentary view similar to a portion of FIG. 4 illustrating a modification of the method and apparatus of the present invention;

FIG. 6 is a view of FIG. 5 showing a later step in the method of the present invention;

FIG. 7 is a fragmentary view of the cooking vessel following the step illustrated in FIG. 6 after removal thereof from the casting apparatus with certain portions to be cut away shown in dashed lines;

FIG. 8 is a view similar to FIG. 5 showing a modification of the present invention;

FIG. 9 is a view similar to FIG. 6 further illustrating the modification of FIG. 8; and FIG. 10 is a view similar to FIG. 7 illustrating the result of the modification of FIGS. 8 and 9 with portions to be cut away shown in dashed lines.

Briefly, the present invention is concerned with eliminating the wrinkling or other distortion of the stainless steel liner when the molten aluminum comes in contact therewith during the casting step in the manufacture of a multilayer cooking vessel. In this manufacturing process, the liner is placed in close fitting engagement with a suitable male die member and molten metal under pressure is cast against the back of the liner. The pressure of the metal is actually used to apply a tensile force to the liner during the casting operation so that any expansion of the liner will be taken up by such force with the result that no wrinkles are formed during the casting operation.

Referring now to FIG. 1 of the drawings, there is shown a cooking vessel 11 which may be manufactured by the method and with the apparatus of the present invention. The present invention is obviously applicable to the manufacture of any heating devices or cooking vessels formed of two metal layers bonded together, and the fact that the invention is specifically illustrated as applied to a cooking vessel of the type commonly referred to as a frying pan is by way of example only. It will be understood that the invention might equally well have been illustrated in connection with a sauce pan, a kettle or some other electrical heating device.

As illustrated in FIG. 1, the cooking vessel generally designated by the reference numeral 11 includes a composite or laminated vessel portion or pan 12 having a liner 13 preferably formed of a hard, dense, impervious material which provides a very desirable cooking surface. Stainless steel is very satisfactory for this purpose and the liner 13 will be referred to as the stainless steel liner although other suitable metals might be employed. Such a liner of stainless steel should be relatively thin to minimize the manufacturing cost, since stainless steel is an expensive metal. The vessel portion or pan 12 further includes an exterior layer 14 which may comprise aluminum, copper or some other layer which is a good heat conductor and hence will tend to spread heat applied thereto over only a limited area throughout its entire surface and, consequently, will cause heat to be uniformly applied to the stainless steel liner 13. In accordance with the present invention, the layer 14 is a cast layer and during one step in the process of the present invention is in molten condition. Aluminum or alloys of aluminum have been found to be especially desirable since they are light and result in a light-weight cooking vessel and yet provide an excellent heat conductor for spreading the heat over the entire surface of the stainless steel liner 13. It will be appreciated that the pan 12 formed of the two layers 13 and 14 must have the layers 13 and 14 intimately bonded together. As far as the present invention is concerned, the nature of this bond is immaterial and consequently the details of the specific bonding process are not disclosed. The bonding process may, however, be similar to those disclosed in the above-mentioned copending applications or Jepson Patent 2,807,700.

Preferably, the cooking vessel 11 disclosed in FIG. 1 of the drawings is provided with a suitable sealed housing for a temperature sensitive element, which housing may be cast integrally with the layer 14. As illustrated, such a housing is designated by the reference numeral 15 and is closed by suitable cover 16 sealed thereto in any suitable manner. A suitable insulating handle portion 17 is secured to the housing 15 as by tubular members 18 which latter may, if desired, be formed of stainless steel. The particular construction of the housing 15, cover 16, insulating handle portion 17 and tubular members 18 may be identical with those disclosed in the above-mentioned Jepson Patent 2,744,995 and the particular construction forms no part of the present invention which is concerned solely with the method and apparatus for making the pan or vessel portion 12 of the heating or cooking device 11.

For the purpose of heating the self-contained cooking vessel 11 there preferably is provided a sheathed type heating element generally indicated at 19 which, as is best shown in FIG. 2 of the drawings, is embedded in the cast layer 14 of the pan 12. Sheathed type heating elements are well known and comprise an external metal sheath 19a within which is disposed a spirally arranged electrical resistance element 19b which is spaced and insulated from the sheath 19a by suitable electrical insulating material 19c, which material, such for example as fused magnesium oxide, is also a fairly good heat conductor. The particular configuration of the sheathed heating element 19 forms no part of the present invention and may comprise a circular loop embedded within a rib 14a formed integrally with the layer 14. This arrangement insures that the heating element is in good thermal conducting relationship with the layer 14 which spreads the heat uniformly to the stainless steel layer 13 bonded thereto. In order to provide a pleasing appearance and also to insure a better bonding operation, the liner 13 preferably has at the edge of the open end of the cooking vessel a rounded rim or bead designated at 13a which blends with the exterior cast layer 14.

In accordance with the present invention, a stainless steel sheet of the desired thickness is preferably deformed by a suitable stamping operation to provide a liner blank generally designated by the reference numeral 13' in FIG. 3 of the drawings. This liner blank 13' has substantially the same configuration as the final layer 13, including the bead or curved rim portion 13a. The blank 13' has a slightly shallower depth than the liner 13, as will become apparent from the ensuing description, and includes a laterally extending flange 22 around the entire periphery thereof, which flange is attached to the bead or curved rim portion 13a, as clearly indicated in FIG. 3 of the drawings. This flange 22 is used during the casting process described hereinafter and is then subsequently cut away to produce the liner 13 of FIG. 2 of the drawings. To provide a strong mechanical bond between the stainless steel liner 13 and the exterior layer 14, the exterior surface of the liner 13 is roughened and cleaned by sand blasting or other suitable means. This cleaned and roughened surface is then preferably flame sprayed with aluminum by known methods, whereupon the blank 13' is ready to be placed in suitable die casting apparatus for casting thereon the layer 14 of aluminum or the like which will molecularly bond to the flame sprayed layer of aluminum.

In FIG. 4 of the drawings the essential features of the die casting apparatus are schematically illustrated. Referring now to this figure, there is shown a lower male die section 23 and an upper female die section 24 which form a part of a suitable die casting unit. Obviously, the unit comprising elements 23 and 24 is designed to have a suitable mold cavity therein designated by the reference numeral 25. The configuration of the mold cavity 25 is identical with the configuration of the pan 12, and the liner blank 13' is disposed within the mold cavity in contact with the lower die section 23 with the flange 22 thereof clamped between the die sections 23 and 24 in the closed position as shown in FIG. 4 of the drawings. Since, as mentioned above, the mold cavity 25 has the same configuration as the exterior of the pan 12, it includes the necessary space to accommodate the rib 14a of the vessel portion or pan 12, which rib is defined by a recess 24a provided in the upper die section 24.

In order to supply molten metal to the mold cavity 25, the latter is connected by passageways 26 and 27 to a cylinder 28 which, during a die casting operation, contains molten metal 29 for forming the cast layer 14. A suitable ram, not shown, is associated with the cylinder 28 and is capable of forcing the molten metal 29 through the passageways 26 and 27 and into the mold cavity 25 under a suitable pressure. Such suitable pressure may be within the range of 3,000 to 30,000 pounds per square inch, as is commonly employed in die casting processes. During use of the die casting unit, obviously the mold is opened and closed as successive laminated structures are manufactured, and for a die casting process where the molten metal has a temperature in excess of 1100° F., the die temperature is usually between 600° and 700° F. Although FIG. 4 of the drawings shows gating the mold at the top, obviously side gating could equally well be used.

For the particular vessel portion or pan 12 illustrated in FIGS. 1 and 2 of the drawings, the lower die section 23 which defines the lower boundary of the mold cavity 25, as viewed in FIG. 4 of the drawings, includes an upwardly directed portion 23a, which is often referred to as the punch. This punch has a configuration snugly to fit the inside of the liner blank 13' over the major surface area thereof, as is clearly shown in FIG. 4 of the drawings when the punch 23a and the liner blank 13' are at the same temperature. Preferably during a casting operation the liner blank 13' is preheated to a temperature of between 600° and 700° F. prior to insertion into the mold cavity 25 so as to be at the same temperature as the mold section 23. Obviously, if the thin liner blank 13' is engaged by the molten metal 29 having a temperature in excess of 1100° F., it will be heated very rapidly due to its small mass and will consequently expand. The die member 23 will not expand as much, since its mass is much greater and its temperature does not rise substantially above the range of 600° to 700° F. The present invention is, therefore, concerned with taking care of the differential expansion between the liner blank 13' and the die member 23. Since the latter expands very little, reference hereinafter is to expansion of the liner, although for absolute accuracy differential expansion is involved.

In order to take care of the expansion of the liner blank 13' so that it continues to snugly fit the punch portion 23a of the die section 23, even though expanding substantially, the hydraulic pressure of the molten metal supplied to the mold 25 is, in accordance with the present invention, used to stretch the liner blank 13' and take up any excess material by virtue of the expansion thereof. To this end the bead or curved rim portion 13a of the liner blank 13' does not initially extend to the bottom of the mold cavity 25 as viewed in FIG. 4 of the drawings, but a clearance space 30 is left beneath the bead or rim portion 13a and a recess 23b in die section 23 which defines the bottom of the mold cavity 25. The depth of this clearance space 30 is designated by the letter A in FIG. 4 of the drawings. Thus there is provided a clearance pocket beneath the liner blank 13' all around the mold cavity 25 into which the liner may expand. Preferably, this clearance pocket is vented to atmosphere so that any air contained therein will not interfere with the stretching of the liner blank 13'. The hydraulic pressure of the molten metal fed into the mold cavity 25 will automatically stretch the liner blank 13' thereby taking up any expansion. The excess of the liner blank 13' fills the clearance pocket 30 so that upon completion of the die casting operation the mold cavity 25 will be completely filled by the pan 12 which was formed from the liner blank 13' and the aluminum backing supplied thereto.

In a unit built in accordance with the present invention, molten aluminum was supplied to the mold cavity 25 at a temperature between 1100° and 1400° F., and at a pressure between 3,000 and 30,000 pounds per square inch. The clearance space A was such as to keep the liner blank 13' snugly in engagement with the die section 23 and no wrinkling or buckling occurred. Thus the casting pressure of the molten aluminum itself performed the metal stretching operation. The clearance space A should be sufficient to make sure that all slack due to expansion of the liner blank 13' is taken up. However, it should not be so great as to cause perforation of the liner blank 13'. In other words, during the die casting operation, the liner blank 13' should be stretched so that the rim portion 13a engages the recess 23b defining the bottom of the mold cavity 25. In manufacturing a vessel of the order of eight to ten inches across with a depth of 1⅝ inches and utilizing a liner blank 13' having a thickness of about .012 inch and a width of the rim or bead 13a of the order of 0.121 inch, a depth A of the clearance space 30 should be between 0.020 and 0.040 inch.

After the aluminum has been injected into the mold cavity 25 and the rim 13a of the liner blank 13' has been moved to the bottom 23b of the mold cavity 25 by the hydraulic pressure of the casting metal, the molten metal quickly cools and solidifies and forms a tenacious bond with the flame sprayed aluminum, which latter is mechanically bonded to the surface of the liner blank 13'. The die is then opened and the laminated pan or the cooking vessel removed therefrom. The flange 22 is then removed in a manner by known methods so that the outer edge of the rim or bead 13a smoothly blends with the layer 14. There is thus completed a cooking vessel having a stainless steel interior which is bonded to a backing layer of aluminum.

In certain situations it may be desirable to increase the tensile force on the liner blank 13' during the casting operation above that available with the configuration shown in FIG. 4 of the drawings. This may be true where low casting pressures are employed or for other reasons, and an increased force can be obtained with a very simple modification of the die from that shown in FIG. 4 of the drawings. In FIGS. 5, 6 and 7 there is disclosed a modification of the present invention wherein the corresponding parts are designated by the same reference numerals as in the preceding embodiment. As there illustrated, the same liner blank 13' with the rim 13a and flange 22 is employed which is converted to the liner 13 shown in FIG. 7 identical with that of FIG. 2. Except for the particular configuration of the mold cavity, everything else in the process represented by FIGS. 5, 6 and 7 is the same as described above.

As illustrated, the lower die member designated as 23' is provided with the same recess 23b defining the bottom of the mold cavity designated as 25'. However, the recess 23b is provided with a lateral extension 23c, and a similar extension 24b is provided in the upper die 24', as clearly indicated in FIGS. 5 and 6 of the drawings, thus exposing more of the flange 22 to pressure of the molten metal. Thus the hydraulic pressure of the molten metal has a larger area of the liner blank 13' against which to exert itself, whereby the tension on the shell or liner blank 13' is increased over that shown in FIG. 4 of the drawings. In this case also the clearance pocket designated as 30' is preferably vented to atmosphere so that air pressure in the pocket will not interfere with the casting operation. Also, the depth of this pocket is again represented by the letter A. FIG. 6 shows a subsequent view during the casting operation with the arrangement of FIG. 5 wherein the liner blank 13' has been stretched by the molten metal 14' to conform to the bottom of the clearance pocket 30' defined by recesses 23c and 23b of the cavity 25', and FIG. 7 shows the composite article produced from the FIG. 5 arrangement immediately upon removal from the mold. The flange portion 22 and a projection 14b provided around the vessel by virtue of the recesses 23c and 24b in the mold are indicated in dashed lines and are subsequently removed by a suitable grinding or other removal process. As in the preceding embodiment for a cooking vessel having a diameter from eight to twelve inches, the depth A of the clearance pocket 30' should be no less than 0.020 inch for a pan depth of 1⅝ inches, and should not be greater than 0.040 inch.

In the arrangements described thus far, the liner blank 13' has been provided with the bead or rim portion 13a shaped in about the manner that the rim in the final vessel is shaped. It has been found that this rim or bead portion 13a may also be produced by utilizing the hydraulic pressure of the molten metal during the die casting operation, and in FIGS. 8, 9 and 10 this modification of the invention is illustrated. The corresponding parts of these figures are designated by the same reference numerals as in the preceding embodiments. As there illustrated, the die comprises the lower section 23 and the upper section 24 identical with those disclosed in FIG. 4 of the drawings, providing the same mold cavity 25. The liner blank is slightly different, however, and is designated by the reference numeral 31. The liner blank 31 does not have the curved or bead portion heretofore designated as 13a, but instead merely has the flange 31a corresponding to the flange 22, as is clearly shown in FIG. 8 of the drawings. This flange 31a is spaced from the recess 23b defining the bottom of the mold cavity 25 by the clearance distance A, as in the preceding embodiments. When molten metal under pressure is supplied to the mold cavity 25 as indicated in FIG. 9 of the drawings, hydraulic pressure causes the liner blank 31 to stretch and thus prevent wrinkling thereof, and simultaneously the bead 31b is defined thereon by causing the liner to conform to the recess 23b of the mold cavity. It will be appreciated that when the step of the process represented by FIG. 9 of the drawings is reached, the liner blank 31 is no different from the liner blank 13' at the same stage during the casting process. Upon removal of the composite article from the mold, the flange 31a is removed and is then identical with that obtained by either of the preceding processes.

It will be appreciated that with the above arrangement there is provided a composite cooking vessel having a very thin liner of stainless steel which provides the hard, dense, impervious cooking surface although having a relatively low coefficient of heat conductivity. Furthermore, the desirable heat spreading backing layer 14 of the aluminum or other metal having a relatively high coefficient of heat conductivity securely bonded thereto insures uniform heating of the thin liner. Preferably, the backing layer 14 is of the order of ⅛ of an inch in thickness, and the liner 13 is of the order of 0.012 inch in thickness. With the arrangement described above, laminated cooking vessels with much thinner liners than it was possible to produce heretofore can be made in a practical and satisfactory manner. Furthermore, with the process of the present invention it is not necessary to preheat the liner to the high casting temperature prior to insertion in the casting unit. Also, as illustrated in a modification of the present invention, it is not necessary to draw the liner to its final depth, and it is not even necessary to draw the rim of the liner at all.

While there have been illustrated and described several embodiments of the present invention, various changes and modifications will occur to those skilled in the art, and it is intended in the appended claims to cover all those changes and modifications which fall within the true spirit and scope of the present invention.

What is claimed as new and desired to be secured by Letters Patent of the United States is:

1. The method of manufacturing a cooking vessel having a relatively thin liner of stainless steel bonded to a cast layer of aluminum with said liner defining a curved rim at the open end of said vessel which comprises, inserting a thin liner of stainless steel having a peripheral flange into a mold cavity with a portion of the peripheral flange clamped by means defining the mold cavity, providing a clearance pocket of the ultimate shape of said curved rim in said mold beneath the portion of said flange eventually defining said rim supplying said molten aluminum under pressure into said cavity against said liner, and utilizing the hydraulc pressure of said molten aluminum against a portion of said flange to take up any expansion of said liner and simultaneously to define said curved rim from a portion of said flange by forcing the same into said clearance pocket.

2. The method of manufacturing a heating device having a heating surface defined by a relatively thin layer of a first metal of a relatively low coefficient of heat conductivity bonded to a cast layer of a second metal of a relatively high coefficient of heat conductivity and with said thin layer defining a rim at the periphery of said heating device, which comprises, inserting a thin layer of said first metal of the configuration of said heating device and having a peripheral flange at the periphery thereof into a mold cavity of similar configuration with said flange clamped by means defining said mold cavity, providing a clearance pocket of the ultimate shape of said rim in said mold beneath the portion of said thin layer eventually defining said rim, supplying said second metal in molten condition under a predetermined pressure into said mold cavity against said thin layer, and utilizing the hydraulic pressure of said molten metal to stretch said thin liner layer by deforming it into said clearance pocket thereby to eliminate any wrinkling of said thin layer by virtue of expansion of said first metal when subjected to the heat of said molten second metal and simultaneously to define said rim from a portion of said flange.

3. The method of claim 2 wherein the depth of said clearance pocket is between 0.020 and 0.040 of an inch.

4. The method of manufacturing a cooking vessel having a cooking surface defined by a relatively thin layer of a first metal of a relatively low coefficient of heat conductivity bonded to a cast layer of aluminum and with said thin layer defining a rim at the open end of said vessel, which comprises, inserting a thin layer of said first metal of the configuration of said cooking vessel and having a peripheral flange at the open end thereof into a mold cavity of similar configuration with said flange clamped by means defining said mold cavity, providing a clearance pocket of the ultimate shape of said rim in said mold beneath the portion of said thin layer eventually defining said rim, supplying said aluminum in molten condition under a predetermined pressure into said mold cavity against said thin layer, and utilizing the hydraulic pressure of said molten aluminum to stretch said thin liner layer by deforming it into said clearance pocket thereby to eliminate any wrinkling of said thin layer by virtue of expansion of said first metal when subjected to the heat of said molten second metal and simultaneously to define said rim from a portion of said flange.

5. The method of claim 4 wherein said molten aluminum is at a temperature in excess of 1100° F.

References Cited in the file of this patent

UNITED STATES PATENTS

| | | |
|---|---|---|
| 1,721,364 | Westerman | July 16, 1929 |
| 2,028,322 | Flammang | Jan. 21, 1936 |
| 2,123,614 | Sinclair | July 12, 1938 |
| 2,332,856 | Kalajian | Oct. 26, 1943 |
| 2,424,235 | Hoffer | July 22, 1947 |
| 2,477,565 | Aske | Aug. 2, 1949 |
| 2,807,700 | Jepson | Sept. 24, 1957 |